April 21, 1964     T. F. GUINAN     3,130,352
ELECTRICAL GROUND TESTING DEVICE
Filed May 13, 1959     2 Sheets-Sheet 1
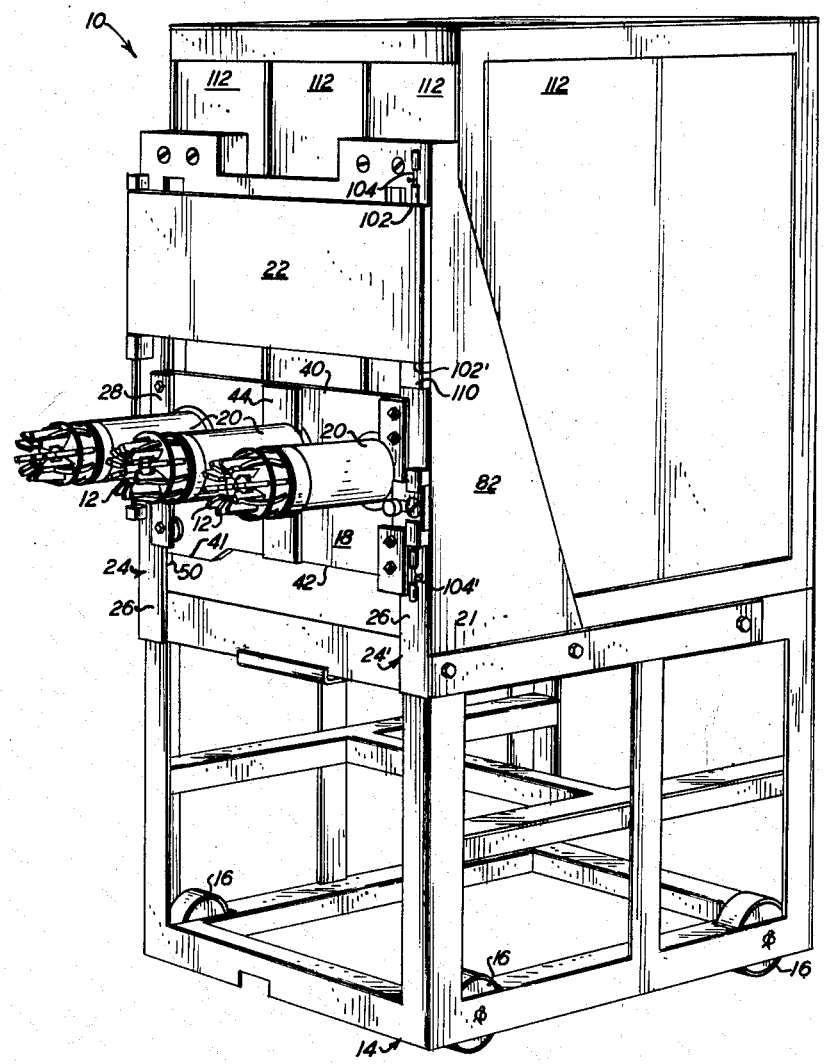
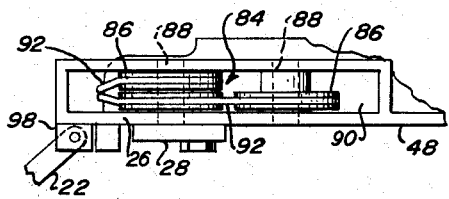
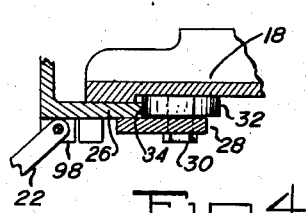
INVENTOR.
THOMAS F. GUINAN
BY *Paul S. Martin*
ATTORNEY April 21, 1964 T. F. GUINAN 3,130,352
ELECTRICAL GROUND TESTING DEVICE
Filed May 13, 1959 2 Sheets-Sheet 2

INVENTOR.
THOMAS F. GUINAN
BY
*Paul S. Martin*
ATTORNEY

United States Patent Office 3,130,352
Patented Apr. 21, 1964

3,130,352
ELECTRICAL GROUND TESTING DEVICE
Thomas F. Guinan, Scranton, Pa., assignor to Federal Pacific Electric Company, a corporation of Delaware
Filed May 13, 1959, Ser. No. 812,896
7 Claims. (Cl. 317—103)

The present invention relates generally to metalclad switchgear and, more particularly, to a ground testing device for use in metalclad switchgear housings or cubicles.

The switchgear housing or cubicle contains line and load separable contact members through which current is led into switching apparatus which is usually removable from the housing. Circuit breakers or switches companion to the housing may be mounted on trucks, or the like, to provide for ease of insertion and removal with respect to the housing to thereby provide for the engagement and disengagement of a circuit breaker or switch with the separable contact members of the switchgear housing. In such installations, it is desirable to be able to ground high-voltage electric lines to protect workmen working on such lines or associated apparatus. The present invention relates to a ground testing device for the aforenoted purpose which is insertable in the switchgear housing after the removal of the switch or circuit breaker therefrom.

One important object of the present invention is the provision of an improved, safe and simplified ground testing device of the aforenoted character in which the contact members thereof may be engaged with a companion set of contact members, within the housing with the first mentioned contact members thereafter being connected to ground. The housing may be provided with line contact members at one level and load contact members at another level. Another object of the present invention is the provision of a ground testing device of the aforenoted character having an improved arrangement for moving the contact members thereof to a selected level to engage either the line or load contact members of the housing.

Another object of the present invention is the provision in a ground testing device of a barrier which is positionally interchangeable with the contact members thereof so that the latter are engageable with the set of contact members of the housing at a corresponding level with the other set of contact members being rendered inaccessible by the barrier. Pursuant to this object of the present invention the contact members of the ground tester are mounted on connector studs carried by a vertically reciprocable plate and the barrier is similarly vertically reciprocable and positionally interchangeable with said plate for the aforenoted purpose.

Another object of the present invention is the provision in a ground tester of the aforenoted character of an improved arrangement for restraining the entry of such tester into the housing except when the contact members and barrier are properly positioned and conditioned for such entry. Pursuant to this object of the present invention the vertically reciprocable plate carrying the connector studs is adapted to be latched in a selected position and the barrier is movable to a closed position when properly vertically oriented with respect to said plate, and it is necessary for both the plate to be latched and the barrier closed to condition the tester for entry into the housing.

Yet another object of the present invention is the provision of a generally improved ground testing device of the aforenoted character which is of generally improved design and construction; safe and highly efficient in use, and which is eminently suitable in the accomplishment of its intended purposes.

The illustrative embodiment of the invention, which has been outlined above as incorporating certain novel features forming part of the invention, is more fully described in the remainder of this specification, from which further novel features and objects and advantages will become apparent. In the following description reference is made to the accompanying drawings forming part of this disclosure, in which drawings:

FIG. 1 is a rear perspective view of a ground testing device formed according to the present invention, the device being conditioned for entry into a companion housing;

FIG. 3 is a detail view of the stud carrying plate counterweight, said view being taken on the line 3—3 of FIG. 2;

FIG. 4 is a sectional view taken on the line 4—4 of FIG. 2;

Figure 2:
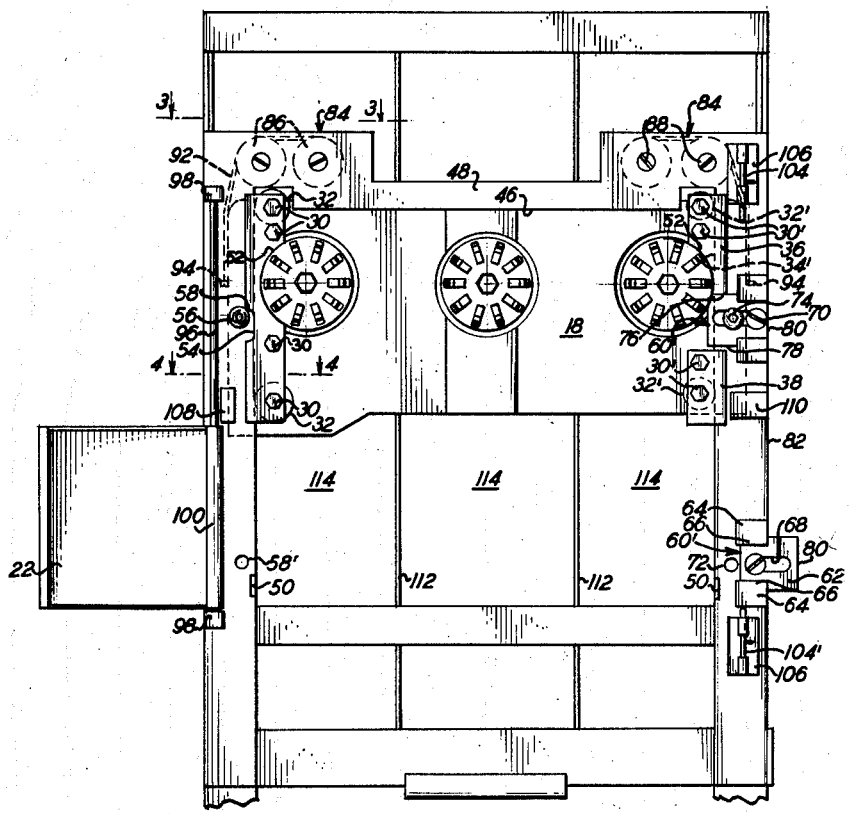
FIG. 2 is a fragmentary rear elevational view of the ground tester with the barrier in an open position.

The switchgear cubicle into which the grounding device 10 of the present invention is to be racked includes a series of stationary parallel contact members at one level which may correspond to the "line" circuit and another series of stationary parallel contact members at another level which may correspond to the "load" circuit, the grounding device having a series of contact members 12 disposed in parallel relation at a common level for selective engagement with either the line or load contact members of the housing (not shown) of the aforereferred to switchgear.

The grounding device 10 comprises a main frame or truck 14 having wheels 16 to facilitate movement of the device, the main frame being a rigid structure formed by suitably interconnecting a series of frame members. At the rear side of the ground tester there is provided a vertically reciprocable plate 18 which carries connector studs 20 which extend therethrough, the latter in turn having contact members 12 mounted at the outer ends thereof. In the illustrated embodiment three such studs are shown corresponding to a three-pole housing, said studs having insulator sleeves thereon and being equi-spaced at a common level. The plate 18 is vertically reciprocable in the manner to be described in detail below to register the contact members 12 with either the line or load contact members of the companion switchgear cubicle. For convenience in description the upper level of members 12 will be referred to as the line position and the lower level will be referred to as the load position. Cooperatively associated with plate 18 is a barrier 22 which is positionably interchangeable with said plate in the manner to be described below.

The frame 14 includes laterally spaced uprights 24 and 24′ having inturned aligned flanges 26 which define tracks for the vertical reciprocation of plate 18. Superposed on plate 18 at one side thereof and in spaced relation therewith is a longitudinal member 28, the latter being secured to said plate by bolts 30. The uppermost and lowermost bolts 30 carry rollers 32 between plate 18 and member 28, said rollers riding on edge 34 of companion flange 26 as best shown in FIG. 4. Superposed on the opposite side of plate 18, in spaced relation therewith, are a pair of longitudinally spaced and aligned members 36 and 38, the latter being secured to said plate by bolts 30′. The uppermost and lowermost of said bolts carry rollers 32′ which ride on edge 34′ of companion flange 26 in the manner of rollers 32. Thus members 28, 36 and 38 are spaced from plate 18 to accommodate tracks 26 of the truck. The plate is vertically reciprocable between the line position shown in FIG. 2 and the load position shown in FIG. 1. The upper edge of the plate is straight as indicated at 40 and the lower edge 41 thereof is cutaway as indicated at 42. Any suitable stop means may be used to define the upper and lower extreme positions of the plate, the upper stop means being constituted by the thickened portion 44 of the plate which coacts with the edge 46 of transverse member 48, and the lower stop means being constituted by stop elements 50 secured to the rear side of the tracks which coact with the lower edge 41, 42 of the plate. The members 28 and 36 are suitably cutaway as indicated at 52 to accommodate studs 20. The member 28 is provided with an elongated recess 54 to accommodate cap screw 56 which is threadedly engaged in aperture 58 or 58' in the track 26 of upright 24.

The frame 14 includes a pair of vertically spaced latch devices 60 and 60' of similar construction for latching the plate 18 in the line and load positions, respectively. Cap screw 56 is threadedly engageable in aperture 58' in the load position of the plate to positively latch the latter thereat in conjunction with latch device 60'. The latch device 60, 60' comprises a latch member 62 which is slidably mounted between a spaced pair of blocks 64 secured to flange 26 of upright 24', said blocks having flanges 66 overlying the latch member. The latch member 62 is provided with an elongated slot 68 for the reception of screw 70 which cooperates with said slot to limit the sliding movement of said latch member. Flange 26 of upright 24' is provided with a threaded aperture 72 for each latch device for the reception of a companion cap screw 74 which is adapted to extend through slot 68 into clamping engagement with latch member 62. In FIG. 2, latch device 60 is shown in latched engagement with the plate 18 and latch device 60' is shown in an unlatched condition. The confronting edges 76 and 78 of members 36 and 38, respectively are spaced to accommodate latch member 62 which is slidable into latched engagement therewith. In the latched position of latch member 62 the outer edge 80 thereof is in substantially flush relation with the sidewall 82 of the frame, the latch member overhanging said sidewall if not properly registered between edges 76 and 78 in attempting to latch plate 18 in position. Such overhanging of the latch member will prevent the entry of the ground tester into the housing or cell by striking the side of the cell. From the above it will be apparent that plate 18 and the components thereof are latched in a selected line or load position by a latch device 60 or 60' and screw 56. In FIG. 2 the plate 18 is shown latched in line position and said plate may be lowered to load position by removing screws 56 and 74 and unlatching member 62, the plate being latched in load position by latching member 62 of latch device 60' and engaging screws 56 and 74 in apertures 58' and 72, respectively of device 60' as in FIG. 1.

A pair of spring-type counterweight devices 84 are operatively connected to plate 18 to facilitate ease of manual reciprocation thereof. Device 84 comprises a pair of spring rollers 86 rotationally mounted on axles 88 in compartment 90 of member 48 (see FIG. 3), said rollers having a band 92 operatively connected therewith, the terminal end of which is fixed to plate 18 at 94. As well known to those skilled in the art the bands 92 are spring biased by the spring rollers in an up or plate raising direction to counterbalance the weight of the plate 18 assembly.

Figure 5:
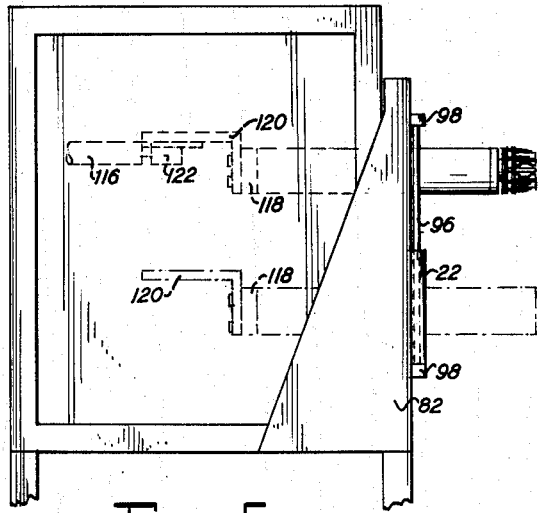
FIG. 5 is a fragmentary side elevational view of the device conditioned for entry into a companion housing.
Figure 6:
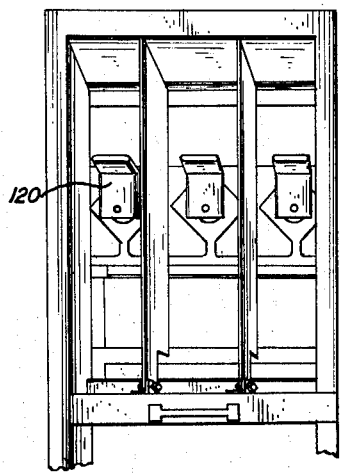
FIG. 6 is a fragmentary front elevational view thereof.

The barrier 22 is pivotally and slidably mounted on the vertical post 96 which has its opposite ends secured in brackets 98 fixed to upright 24. One side of barrier 22 is constituted by a bearing fitting 100 which is mounted on post 96, said fitting being pivotally and slidably mounted on said post. The opposite side of the barrier 22 is provided with apertures 102 and 102' for cooperation with latch bolts 104 and 104', respectively to latch barrier 22 in a closed position. The latch bolts 104 and 104' are mounted in brackets 106 secured to upright 24' for slidable movement in a vertical direction into and out of engagement with companion apertures 102 and 102', respectively of the barrier. The barrier isolates or renders inaccessible one set of contact members of the housing when the other set of contact members thereof are engaged with contact members 12 of plate 18. The barrier and plate are positionably interchangeable for this purpose, the barrier being unlatched and swung to an open position as shown in FIG. 2 to permit the plate 18 to be reciprocated to the opposite position in the manner described above. In the open position of the barrier the plate is cleared for vertical reciprocation whereas in the closed position of the barrier the latter obstructs and effectively prevents plate movement to an opposite position. In an open position of the barrier the latter restrains the entry of the ground tester into an operative position in the housing, it being essential that the barrier be fully closed, as shown in FIGS. 1 and 5, to permit the ground tester to be racked into the housing. The barrier can be fully closed when positioned in either the line or load position opposite to the position of plate 18, there being abutment 108 projecting from upright 24 which prevent the closure of the barrier at an intermediate position, the barrier clearing said abutment at the extreme line and load positions. It is essential that the barrier be swung outwardly of the abutment and studs 20 to permit sliding movement thereof along the post 96 to an opposite position.

In practice, the ground tester is conditioned for racking-in in a companion housing with the plate latched at one level and the barrier latched at the other level as shown in FIG. 1. To interchange the plate and barrier from the load and line position, respectively in FIG. 1 for example, the barrier is unlatched from latch bolt 104 and swung to an open position clearing the abutment and studs and slid on post 96 to the load level. The plate assembly may then be unlatched and raised to the line position as aforedescribed and latched thereat as shown in FIG. 2. The lower latch member 62 will be moved inwardly to clear sidewall 82, which is a prerequisite for closing the barrier, and the barrier will be swung closed and latched by the latch bolt 104'. The ground tester thus can only be racked into position in the housing with the plate latched into position and the barrier fully closed and this can only be accomplished with the plate and barrier properly oriented at their respective positions. A block 110 is positioned at a common level with the abutment 108 and defines a guide for the free side of the barrier, the latter clearing the block 110 on closing in properly oriented position.

Vertical partition members 112 of insulating material define three isolated compartments 114 therebetween for the studs 20 and their associated conductors. The conductors 118 of the studs may be shorted together or provided with individual test leads or cables 116, when the grounding device has been racked into position. Each of the conductors 118 of the studs has electrically and mechanically secured thereto a contact flange 120, in the form of an angle member, to which is secured fitting 122 of companion cable 116. The cables 116 will be connected to a suitable ground so that any current which may reach the contact members in circuit therewith will be safely grounded without danger to the workmen. The contact flanges 120 will be isolated in their respective compartments 114.

While there has been disclosed above an exemplary embodiment of the invention which is presently preferred, nevertheless it will be apparent to those skilled in the art that various modifications and varied applications may be made of the novel features; and consequently the invention should be broadly construed in accordance with its full spirit and scope.

Having thus described my invention what I claim as new and desire to secure by Letters Patent is:

1. A testing device for insertion in a companion cell, where the cell has a front opening and two parallel horizontal rows of electrical terminals at respective levels at the rear of the cell facing the front opening thereof, said testing device including a mobile frame structure receivable in such cell, a horizontally elongated barrier unit proportioned to block access to one row only of said rows of terminals in the cell, a stud-carrying unit including a horizontal row of contact studs mutually spaced apart so as to be cooperable with a row of terminals in the cell, and means for interchangeably mounting said barrier unit and said stud-carrying unit on said frame structure at respective levels, selectively, confronting the respective rows of contact terminals in the cell, said studs projecting to the rear of said barrier unit for engaging corresponding cell terminals.

2. A testing device in accordance with claim 1, said stud-carrying unit including a barrier plate through which said studs extend, said barrier plate and said elongated barrier unit complementing each other at respective levels for shielding both cell-terminal levels.

3. A test device in accordance with claim 1, further including latching means for holding said stud-carrying unit accurately in place at each said level thereof, said latching means including a part that occupies an outward projecting position relative to said frame structure so as to impede insertion of the test device into the cell, in the unlatched condition of said latching means.

4. A testing device for insertion in a companion cell, where the cell has a front opening and two parallel horizontal rows of electrical terminals at two levels at the rear of the cell facing the front opening thereof, said testing device including a mobile frame structure receivable in such cell, a horizontally elongated barrier unit proportioned to block access to one row only of said rows of cell terminals, a stud-carrying unit including a horizontal row of contact studs mutually spaced apart so as to be cooperable with a row of terminals in the cell, means for interchangeably mounting said barrier unit and said stud-carrying unit in fixed positions on said frame structure at respective levels, selectively, for confronting corresponding rows of contact terminals in the cell, said studs projecting to the rear of said frame structure, said mounting means including means retaining assembly of each of said units to said frame structure during shift thereof in the course of interchanging the fixed positions of said units, one of said units in its fixed position being disposed as an obstruction blocking direct shift of the other unit from its fixed position to another such fixed position, the mounting means of said one of said units accommodating displacement of such unit out of the aforesaid obstructing position thereof, to a projecting position outward of the frame structure, whereby said one unit, after its removal from its obstructing position allowing shift of the other unit, constitutes an obstruction against insertion of the testing device into a cell until said one unit is restored to a fixed position confronting a row of cell contact terminals.

5. A test device in accordance with claim 4, said barrier unit and the remainder of said test device having mutually obstructing devices preventing return of the barrier unit from the projecting position thereof to a said fixed position at any level between the fixed positions of the barrier unit confronting the cell terminals.

6. A testing device for insertion in a companion cell, where the cell has a front opening and two parallel horizontal rows of electrical terminals at respective levels at the rear of the cell facing the front opening thereof, said testing device including a mobile frame structure receivable in such cell, a horizontally elongated barrier proportioned to block access to one row only of said rows of terminals in the cell, a stud-carrying unit including a horizontal row of contact studs mutually spaced apart so as to be cooperable with a row of terminals in the cell, and means for interchangeably mounting said barrier and said stud-carrying unit on said frame structure at respective levels and in respective fixed positions on the frame structure confronting the respective rows of contact terminals in the cell, said studs projecting to the rear of said barrier for engaging corresponding cell terminals, guide means constraining said stud-carrying unit to move along a predetermined path in moving from the level of one row of cell terminals to the level of the other row of cell terminals, said barrier when in said fixed position obstructing said path, and the mounting means of said barrier including a vertical sliding and hinged connection at a lateral edge thereof allowing the barrier to be removed from said obstructing position to a position projecting outwardly of the frame so as to allow interchange of said barrier and said stud-carrying units only upon outward movement of the barrier, vertical shift thereof to a different level, reverse vertical shift of the stud-carrying unit, and removal of said barrier from its projecting position relative to the frame and into a position blocking access to a row of cell contact terminals.

7. A test device in accordance with claim 6 wherein said vertical sliding and hinged connection includes a vertical rod fixed to said frame at a rear vertical corner thereof and wherein said barrier has a companion sliding and pivotal bearing, said frame structure being disposed as an obstruction against pivotal movement of said barrier out of the aforementioned fixed position thereof inward of the frame structure, so that removal of the barrier from its position obstructing the vertical shift of the stud-carrying unit compels movement of the barrier to an outward projecting position interfering with normal insertion of the test device into the cell.

References Cited in the file of this patent
UNITED STATES PATENTS

| | | |
|---|---|---|
| 1,609,925 | Wood | Dec. 7, 1926 |
| 2,353,518 | Specht | July 11, 1944 |
| 2,504,775 | Wood | Apr. 18, 1950 |
| 2,579,992 | Wood | Dec. 25, 1951 |
| 2,673,260 | Lester | Mar. 23, 1954 |
| 2,691,713 | Astin | Oct. 12, 1954 |
| 2,735,042 | Hayford | Feb. 14, 1956 |